United States Patent Office 3,529,896
Patented Sept. 22, 1970

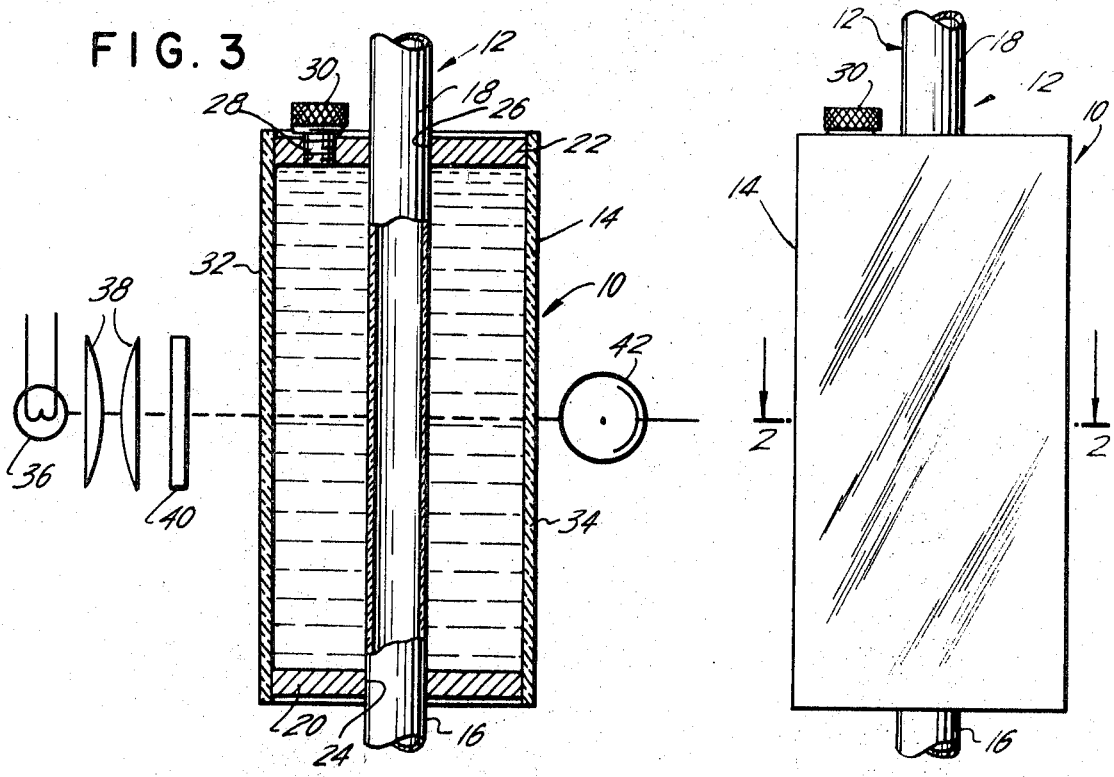
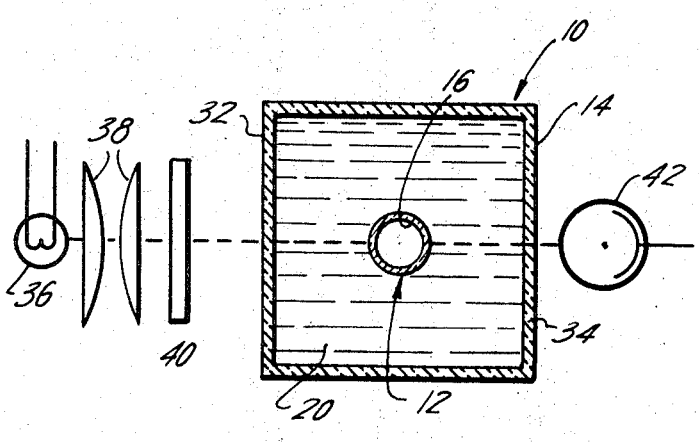
FIG. 3
FIG. 1
FIG. 2

3,529,896
FLOW CELL IMMERSED IN A FLUID HAVING THE SAME REFRACTIVE INDEX AS THE FLOW CELL
Jacques Padawer, Hastings-on-Hudson, N.Y., assignor to Technicon Corporation, a corporation of New York
Filed June 20, 1966, Ser. No. 558,706
Int. Cl. G01j *3/46;* G01n *21/06, 1/10*
U.S. Cl. 356—181     4 Claims

ABSTRACT OF THE DISCLOSURE

A tubular glass flow cell is positioned and extends through a container having planar parallel sides of transparent material. The container is filled with a liquid medium and, also, treated samples are carried through the flow cell in a liquid stream, each of which has substantially the same refractive index as the glass flow cell.

---

This invention relates to colorimeter flow cells for use with apparatus for the quantitative analysis of a liquid in respect to a known ingredient. Such apparatus is disclosed, for example, in U.S. Pat. Nos. 2,797,149, 2,879,141 and 3,241,432, among others, assigned to the assignee of the present invention.

In the colorimetric examination of a liquid as above indicated, light is transmitted through the liquid flowing through the flow cell and the light transmittance of the liquid is measured in a well known way for indicating the concentration of the ingredient for which the analysis is made.

Due to refraction of light which occurs when light passes from a medium of one refractive index to a medium of a different refractive index there may be a considerable loss of light in the flow cell. Moreover, a beam of light of more than one frequency is split by refraction into a plurality of light beams of respective different frequencies.

With curved surfaces such as the curved surface of a tubular glass flow cell the refraction of the light not only can result in light loss but, also, can adversely affect the spectral response of the light photo-electric detector of the colorimeter, thus adversely affecting the operation and reliability of the colorimeter for measuring the light transmittance of the liquid.

The primary object of this invention is to obviate, or at least greatly reduce, the above-mentioned disadvantages. Each of the above-mentioned disadvantages is obviated according to the invention by providing a flow cell device which has provision for the passage of light to the flow cell from a medium which has the same refractive index as the glass of the flow cell so that the light which enters the flow cell is neither refracted nor dispersed, irrespective of the angle at which the light enters the cell.

The invention will be described with reference to the accompanying drawings which illustrate the presently preferred embodiment of the invention. In the drawings:

FIG. 1 is a vertical side view of a flow cell device embodying the invention;

FIG. 2 is a cross-sectional view of the flow cell device on the line 2—2 of FIG. 1; and FIG. 3 is a central vertical section view of the device.

Referring now to the drawings in detail, the flow cell device 10 comprises a glass tube 12 adapted to be mounted in vertical position within a jacket 14 which surrounds said tube. Tube 12 has a lower liquid inlet 16 and an upper liquid outlet 18 and constitutes a tubular flow cell through which flows the liquid which is to be colorimetrically examined. Jacket 14 is liquid tight and for that purpose is provided with end caps 20 and 22 in liquid-tight relation to the tubular flow cell 12 which projects through said caps as indicated at 24 and 26. The upper cap 20 is provided with an opening 28 through which liquid may be poured into the jacket, said opening having a releasable closure indicated at 30.

Jacket 14 is provided with flat planar glass light-entrance and light-exit parts 32 and 34, respectively, normal to the light beam emanating from the light source. As here shown, said source includes an electric lamp 36, condenser lenses 38, and an interference light filter 40. The colorimeter photo-electric detector is indicated at 42 in light-receiving relation to the light-exit 34 of jacket 14.

Jacket 14 is filled with a liquid having the same or nearly the same refractive index as that of the glass flow cell 12. In this respect, the invention may be practiced to great advantage even though the refractive index of the liquid and that of flow cell 12 are not matched exactly. For example, excellent results are obtained when the liquid is glycerine and the glass flow cell 12 is "Pyrex" glass, the refractive index of glycerine being 1.4729 and the refractive index of said glass being 1.474.

As light enters the liquid in jacket 14 through the light entrance 32, the light is not refracted or dispersed because the liquid, in which the flow cell is immersed, and said light entrance is normal to the light beam. Since the liquid has the same refractive index as that of the flow cell 12, the light is neither refracted nor dispersed at the curved surface of the cell.

In addition to the above-described provision for reducing refraction and dispersion of light, refraction and dispersion of light occurring at the inner curved surface of the flow cell can be obviated by transmitting the treated sample through the flow as a liquid having the same or substantially the same refractive index of the parts of the glass flow cell through which the light passes into and out of the cell. For this purpose the liquid reagent with which the sample is treated should be of the desired refractive index or the sample can be colorimetrically examined while it is transmitted through the cell in a neutral liquid of the desired refractive index.

The way the flow cell 12 is utilized in the automatic analysis apparatus will be obvious to those skilled in the art to which this invention relates. If additional information is desired, reference may be had to the above-mentioned U.S. patents and to the U.S. Pat. No. 3,236,602 to Jack Isreeli. Said last-mentioned patent shows a device for removing segmentizing bubbles of air or other inert gas from the treated liquid before the liquid is transmitted to the flow cell and it will be understood that the liquid outlet of such device would be connected to inlet 16 of the flow cell of the present invention. It is within the scope of this invention to mount the flow cell in respect to the light source as shown in said Isreeli Pat. No. 3,236,602, so that the light enters the flow cell at or near one end of the cell and exits at or near the opposite end of the cell.

While I have shown and described the preferred embodiments of my invention, it will be understood that the invention may be embodied otherwise than as herein

What is claimed is:

1. A colorimeter flow cell device comprising a light source, a light detector, container means having planar parallel surfaces defining a light entrance and a light exit, respectively, along a light path between said source and said detector, a flow cell positioned in said container and having a transparent tubular portion disposed in said light path transversely thereof and including a liquid inlet and a liquid outlet external of said container means, said container containing a transparent liquid having substantially the same refractive index as said transparent portion of said flow cell, and carrier means for transporting a sample to be analyzed along said flow cell and through said light path, said carrier means comprising a liquid having substantially the same refractive index as said transparent portion of said flow cell.

2. A colorimeter flow cell device according to claim 1 wherein said carrier means comprises a neutral fluid.

3. A colorimeter flow cell device according to claim 1 wherein said carrier means is a liquid reagent with which said sample is treated.

4. A colorimeter flow cell device according to claim 1 wherein said transparent portion of said flow cell is formed of a glass material having a refractive index in the order of 1.474.

References Cited

UNITED STATES PATENTS

| | | |
|---|---|---|
| 3,328,502 | 6/1967 | Robson. |
| 2,197,190 | 4/1940 | Mott-Smith. |
| 2,427,996 | 9/1947 | Seaman _____ 250—218 |
| 2,980,802 | 4/1961 | Bracey et al. |
| 2,999,417 | 9/1961 | Isreeli. |
| 3,236,602 | 2/1966 | Isreeli _____ 250—218 X |
| 3,320,018 | 5/1967 | Pepke. |
| 3,389,950 | 6/1968 | Harper _____ 350—179 X |

FOREIGN PATENTS 1,187,698   9/1959   France.

RONALD L. WIBERT, Primary Examiner

W. A. SKLAR, Assistant Examiner

U.S. Cl. X.R.

23—253; 250—218; 356—184, 186, 208, 246